United States Patent
Takasuka

(10) Patent No.: US 7,276,030 B2
(45) Date of Patent: Oct. 2, 2007

(54) METHOD AND APPARATUS FOR DETECTING HUMAN BODY IN A VEHICLE

(75) Inventor: Hirofumi Takasuka, Kobe (JP)

(73) Assignee: Fujitsu Ten Limited, Kobe-shi (JP)

( * ) Notice: Subject to any disclaimer, the term of this patent is extended or adjusted under 35 U.S.C. 154(b) by 505 days.

(21) Appl. No.: 10/490,501

(22) PCT Filed: Jul. 24, 2003

(86) PCT No.: PCT/JP03/09403

§ 371 (c)(1),
(2), (4) Date: Mar. 22, 2004

(87) PCT Pub. No.: WO2004/011961

PCT Pub. Date: Feb. 5, 2004

(65) Prior Publication Data

US 2005/0122222 A1   Jun. 9, 2005

(30) Foreign Application Priority Data

Jul. 29, 2002   (JP) .............................. 2002-220275

(51) Int. Cl.
*A61B 5/08* (2006.01)
(52) U.S. Cl. .................... 600/534; 600/529; 340/573.1
(58) Field of Classification Search ................ 600/534, 600/546, 547; 340/573.1, 573.2
See application file for complete search history.

(56) References Cited

U.S. PATENT DOCUMENTS 5,404,128 A    4/1995  Ogino et al.
5,724,024 A *  3/1998  Sonderegger et al. ....... 340/562
6,195,008 B1 * 2/2001  Bader ....................... 340/573.1

FOREIGN PATENT DOCUMENTS

| JP | 7-204166 | 8/1995 |
| JP | 8-507706 | 8/1996 |
| JP | 2827534 | 9/1998 |
| JP | 2003-66157 | 3/2003 |
| WO | WO94/20021 | 9/1994 |

OTHER PUBLICATIONS

Patent Abstract of Japan, Publication 04269690 A, Appln No. 03030635, Published Sep. 25, 1992, in the name of Ogino.
Patent Abstract of Japan, Publication 07204166 A, Published Aug. 8, 1995, in the name of Shimada.
International Search Report of PCT/JP03/09403, dated Nov. 18, 2003.
Patent Abstract of Japan 2003066157 A, Published Mar. 5, 2003, in the name of Shinojima et al.

* cited by examiner

*Primary Examiner*—Charles A. Marmor, II
*Assistant Examiner*—Zoe E Baxter
(74) *Attorney, Agent, or Firm*—Christie, Parker & Hale, LLP

(57) ABSTRACT

Chest motion associated with breathing is detected to obtain a breathing motion signal representing the chest motion in the form of an electrical signal; then, the times at which specific points occur in the waveform of the breathing motion signal are detected and, when the time interval between the specific points is within a predetermined range, the presence of a human body is detected in a vehicle.

19 Claims, 15 Drawing Sheets

METHOD AND APPARATUS FOR DETECTING HUMAN BODY IN A VEHICLE

CROSS-REFERENCE TO RELATED APPLICATION

This application is a National Phase Patent Application of International Application No. PCT/JP2003/009403, filed on Jul. 24, 2003, which claims priority of Japanese Patent Application No. 2002-220275, filed on Jul. 29, 2002.

TECHNICAL FIELD

The present invention relates to a method and an apparatus for detecting the presence of a human body and, more particularly, to a method for detecting the presence of a human body in a vehicle.

BACKGROUND ART

It is practiced to detect the movement of a person inside a vehicle by using a radar sensor, an ultrasonic sensor, or the like. For example, Tokuhyouhei (Published Japanese translation of PCT application) No. 8-507706 (WO 94/20021) discloses an invention concerning an ultrasonic motion monitor for monitoring the breathing motions of a human being or other mammals. Further, Japanese Unexamined Patent Publication No. 7-204166 and Japanese Patent No. 2827534 disclose that the presence of a human body is detected by detecting the breathing motions of a human by using a piezoelectric element.

There often occur such accidents as a child being left in a vehicle in the intense heat of summer and dying, because of the heat, in the vehicle. To prevent the occurrence of such a tragedy, a system is being studied that detects the presence of a human inside a vehicle, and that issues some kind of alarm when the temperature inside the vehicle becomes excessively high.

DISCLOSURE OF THE INVENTION

It is an object of the present invention to detect the presence of a human body such as an infant inside a vehicle by using a breathing motion signal.

According to the present invention, chest motion associated with breathing is detected to obtain a breathing motion signal representing the chest motion in the form of an electrical signal; then, based on the waveform of this signal, it is determined whether or not the detected motion is a human breathing motion and, if it is a human breathing motion, the presence of a human body is detected in the vehicle.

More specifically, the times at which specific points occur in the waveform of the breathing motion signal are detected and, when the time interval between the specific points is within a predetermined range, the presence of a human body is detected in the vehicle.

Here, provisions are made to avoid the occurrence of false detection due to noise introduced into the signal by external disturbances.

According to a first embodiment of the present invention, the times ($T(n)$) at which peaks occur on the positive or negative side of the waveform of the breathing motion signal are detected to obtain a peak-to-peak time interval ($\Delta T(n)$), a difference ($\Delta t(n)$) between peak-to-peak time intervals is obtained from the peak-to-peak time interval ($\Delta T(n)$), the number of times that the difference ($\Delta t(n)$) between the peak-to-peak time intervals is smaller than a predetermined value ($Tth$) is counted by a counter, and when the number of times counted is larger than a predetermined number ($Cth$), the presence of a human body is detected in the vehicle.

According to a second embodiment of the present invention, the times ($Tu(n)$) at which the waveform of the breathing motion signal rises or falls are detected to obtain a time interval ($\Delta Tu(n)$) between the rising or falling times, a difference ($\Delta tu(n)$) between time intervals is obtained from the time interval ($\Delta Tu(n)$), the number of times that the difference ($\Delta tu(n)$) between the time intervals is smaller than a predetermined value ($Tuth$) is counted by a counter, and when the number of times counted is larger than the predetermined number ($Cth$), the presence of a human body is detected in the vehicle.

According to a third embodiment of the present invention, a waveform width time interval ($\Delta Tud(n)$) of the breathing motion signal is detected, a difference ($\Delta tud(n)$) between waveform width time intervals is obtained from the waveform width time interval ($\Delta Tud(n)$), the number of times that the difference ($\Delta tud(n)$) between the waveform width time intervals is smaller than a predetermined value ($Tudth$) is counted by a counter, and when the number of times counted is larger than the predetermined number ($Cth$), the presence of a human body is detected in the vehicle.

According to a fourth embodiment of the present invention, the times at which positive and negative peaks occur in the waveform of the breathing motion signal are detected, the ratio of the time interval from the positive peak to the negative peak or from the negative peak to the positive peak to the time interval from the positive peak to the next positive peak is obtained, the number of times that the ratio is within a predetermined range is counted by a counter, and when the number of times counted is larger than the predetermined number ($Cth$), the presence of a human body is detected in the vehicle.

According to the present invention, the difference ($\Delta t(n)$) between the peak-to-peak intervals on the waveform of the breathing motion signal is obtained, and the presence of a human body is detected based on that difference. Accordingly, it can be correctly determined whether the detected motion is a human breathing motion or not, irrespective of variations in breathing cycle among people.

Further, the number of times that the difference ($\Delta t(n)$) between the peak-to-peak time intervals is smaller than the predetermined value ($Tth$) is counted by the counter and, when the number of times counted is larger than the predetermined number ($Cth$), it is determined that the detected motion is a human breathing motion, and the presence of a human body is thus detected. This ensures reliable detection of the presence of a human body.

When the peaks are not larger in magnitude than a predetermined level ($Vth1$), the counter is reset, thereby avoiding the occurrence of fault detection due to external disturbances or other factors than breathing motion.

According to the present invention, the difference ($\Delta tud(n)$) between the width time intervals on the waveform of the breathing motion signal is obtained, and the presence of a human body is detected based on that difference. Accordingly, it can be correctly determined whether the detected motion is a human breathing motion or not, irrespective of variations in breathing cycle among people.

According to the present invention, the times at which positive and negative peaks occur in the waveform of the breathing motion signal are detected, the ratio of the time interval from the positive peak to the negative peak or from the negative peak to the positive peak to the time interval from the positive peak to the next positive peak is obtained, and the presence of a human body is detected based on that ratio. Accordingly, it can be correctly determined whether the detected motion is a human breathing motion or not, irrespective of variations in breathing cycle among people.

DETAILED DESCRIPTION OF THE INVENTION

Figure 1:
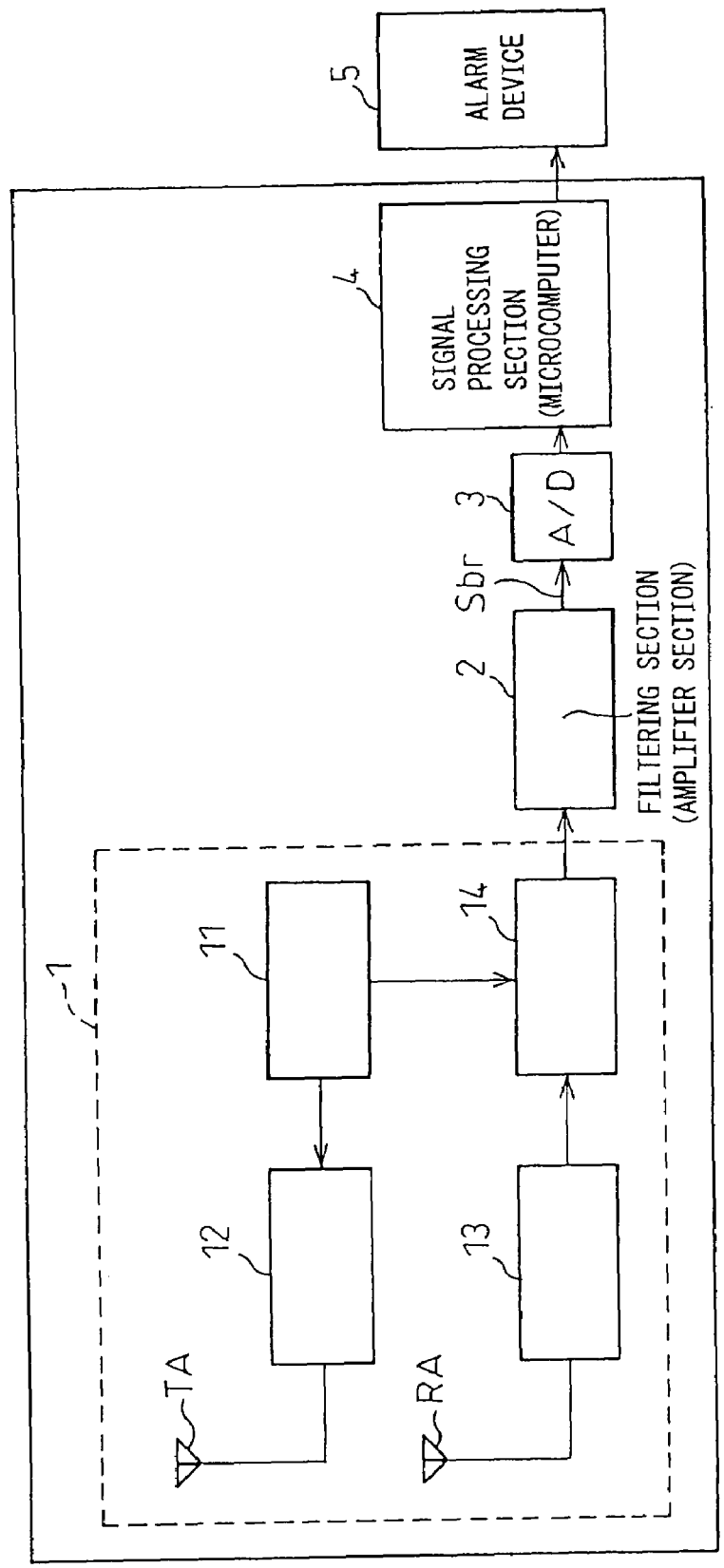
FIG. 1 is a diagram showing one example of a human body detection apparatus for implementing a method for detecting a human body in a vehicle according to the present invention.

FIG. 1 is a diagram showing one example of a human body detection apparatus for implementing a method for detecting a human body in a vehicle according to the present invention. Reference numeral 1 is a sensor section which includes an oscillator 11, a transmitter 12, a transmitting antenna TA, a receiving antenna RA, a receiver 13, and a mixer 14. An output of the oscillator 11 is fed to the transmitter 12 and radiated from the transmitting antenna TA toward a human body. The reflected wave from the chest of the breathing human body is received by the receiving antenna RA, and the received reflected wave is fed from the receiver 13 into the mixer 14 where the output of the receiver 13 is mixed with a portion of the output of the oscillator 11. The signal produced by mixing is fed to a filtering section 2, and a breathing motion signal Sbr output from it is fed to an A/D converter 3 and processed in a signal processing section 4 to detect the presence of the human body. The output of the signal processing section 4 is supplied to an alarm device 5 which, if required, issues an alarm when the presence of the human body is detected by the signal processing section 4.

The configuration of the sensor section of the human body detection apparatus described above is only one example of the configuration for obtaining the breathing motion signal waveform, and other sensors such as an ultrasonic sensor or a piezoelectric element can be used to obtain the breathing motion signal.

According to the present invention, the breathing motion signal is processed and, when a prescribed condition or conditions are satisfied, it is determined that the presence of a human body has been detected. The breathing motion signal is processed by the signal processing circuit 4 shown in FIG. 1, and detections, calculations, decisions, etc. described in the flowcharts illustrating the embodiments herein are performed in the signal processing section.

EMBODIMENT 1

Figure 2:
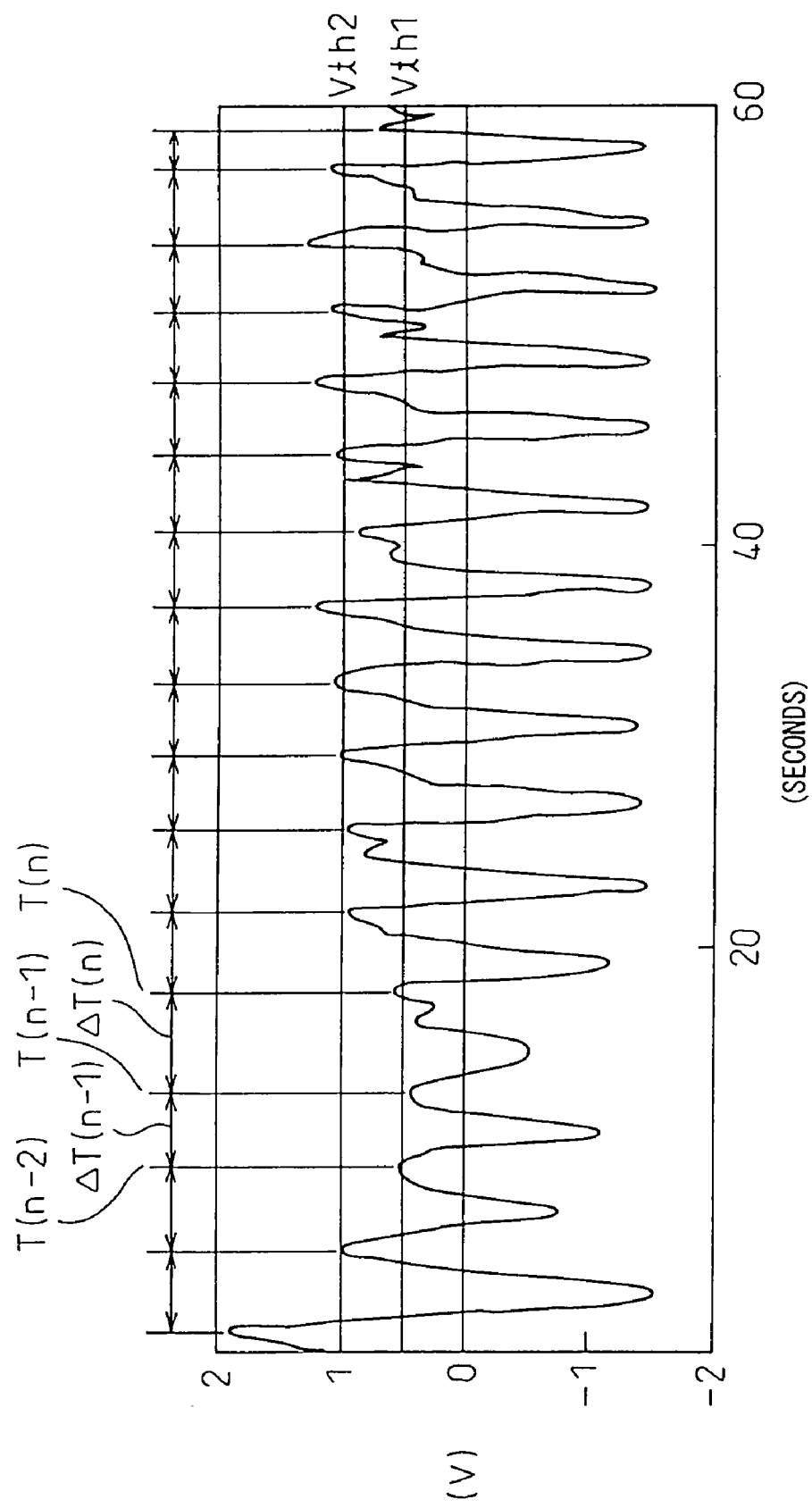
FIG. 2 is a diagram showing the signal waveform of a human breathing motion obtained by the human body detection apparatus.

FIG. 2 is a diagram showing the signal waveform of a human's breathing motion obtained by the human body detection apparatus. In the case of the human body detection apparatus of FIG. 1, this signal waveform is the waveform of the output signal of the filtering section 2. The abscissa represents the time (seconds), and the ordinate represents the breathing motion expressed in volts (V).

According to the first embodiment, the times at which peaks occur in the signal waveform shown in FIG. 2 are detected, and the time interval between each peak is calculated. Since, usually, a human breathing motion is substantially periodic, the difference $\Delta t$ between any two successive peak-to-peak time intervals $\Delta T$ is normally substantially constant. Therefore, in the present invention, when the difference $\Delta t$ between the peak-to-peak time intervals $\Delta T$ is smaller than a predetermined value, it is determined that the detected motion is a human breathing motion.

Figure 3:
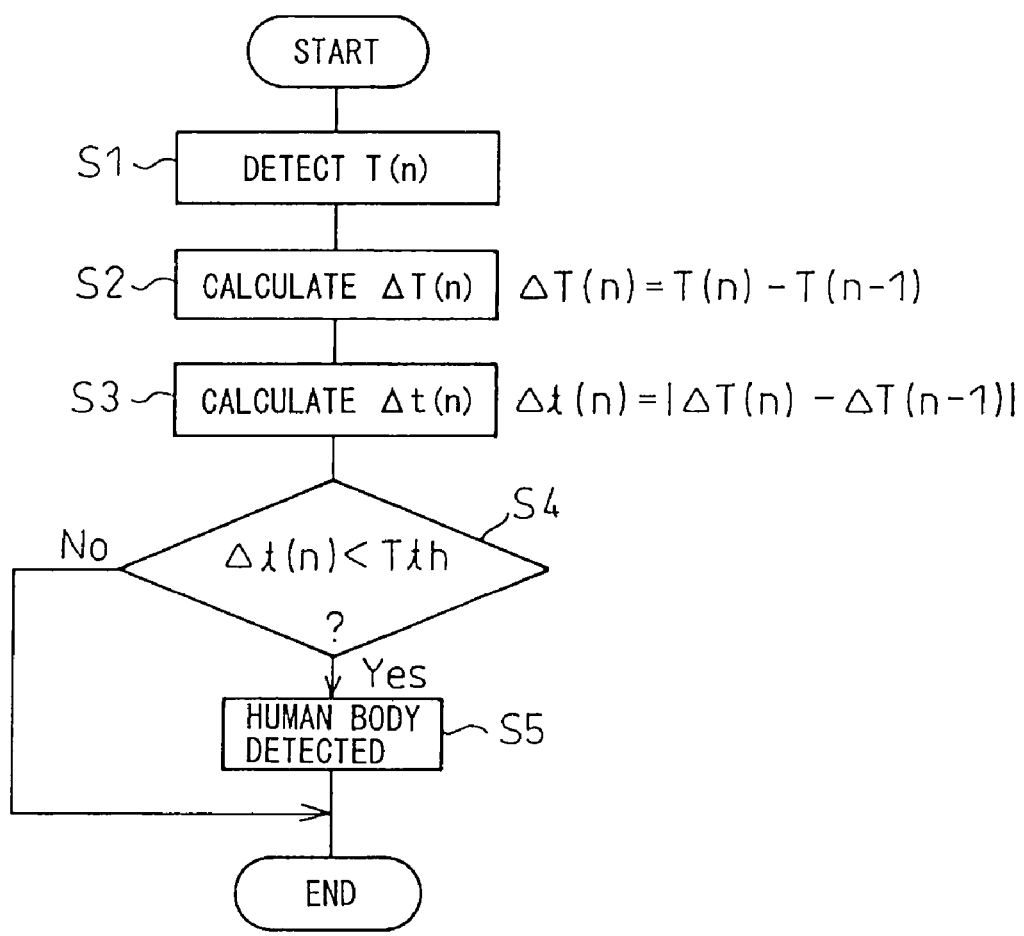
FIG. 3 is a diagram showing in flowchart form a human body detection method according to the present invention.

FIG. 3 is a diagram showing, in flowchart form, a human body detection method according to the present invention. In FIG. 3, first the times $T(n)$ at which peaks occur in the breathing motion waveform are detected (S1). Next, the peak-to-peak time interval $\Delta T(n)=T(n)-T(n-1)$ is calculated (S2). Then, the difference $\Delta t(n)$ between peak-to-peak time intervals $\Delta T(n)$ is calculated (S3). The difference $\Delta t(n)$ between the peak-to-peak time intervals is the difference between $\Delta T(n)$ and $\Delta T(n-1)$, which is calculated as $$\Delta t(n) = |\Delta T(n) - \Delta T(n-1)| \text{ (absolute value)}$$

where $$\Delta T = T(n) - T(n-1) \text{ and}$$

$$\Delta T(n-1) = T(n-1) - T(n-2)$$

Normally, the period of human breathing is substantially constant, and the difference $\Delta t(n)$ between the peak-to-peak time intervals is extremely small. Accordingly, if this difference is smaller than a predetermined value, it can be determined that the detected motion is a human breathing motion.

Therefore, it is next determined whether Δt(n) is smaller than the predetermined threshold value Tth (S4) and, if the condition Δt(n)<Tth is satisfied (Yes), then it is determined that the waveform represents a human's breathing motion, thus detecting the presence of a human body (S5). If No in S4, the process is terminated thereupon.

In the above embodiment, the presence of a human body is detected by detecting the times at which peaks occur on the positive side of the signal waveform, but the presence of a human body can also be detected by detecting the times at which peaks (bottoms) occur on the negative side of the signal waveform.

Figure 4:
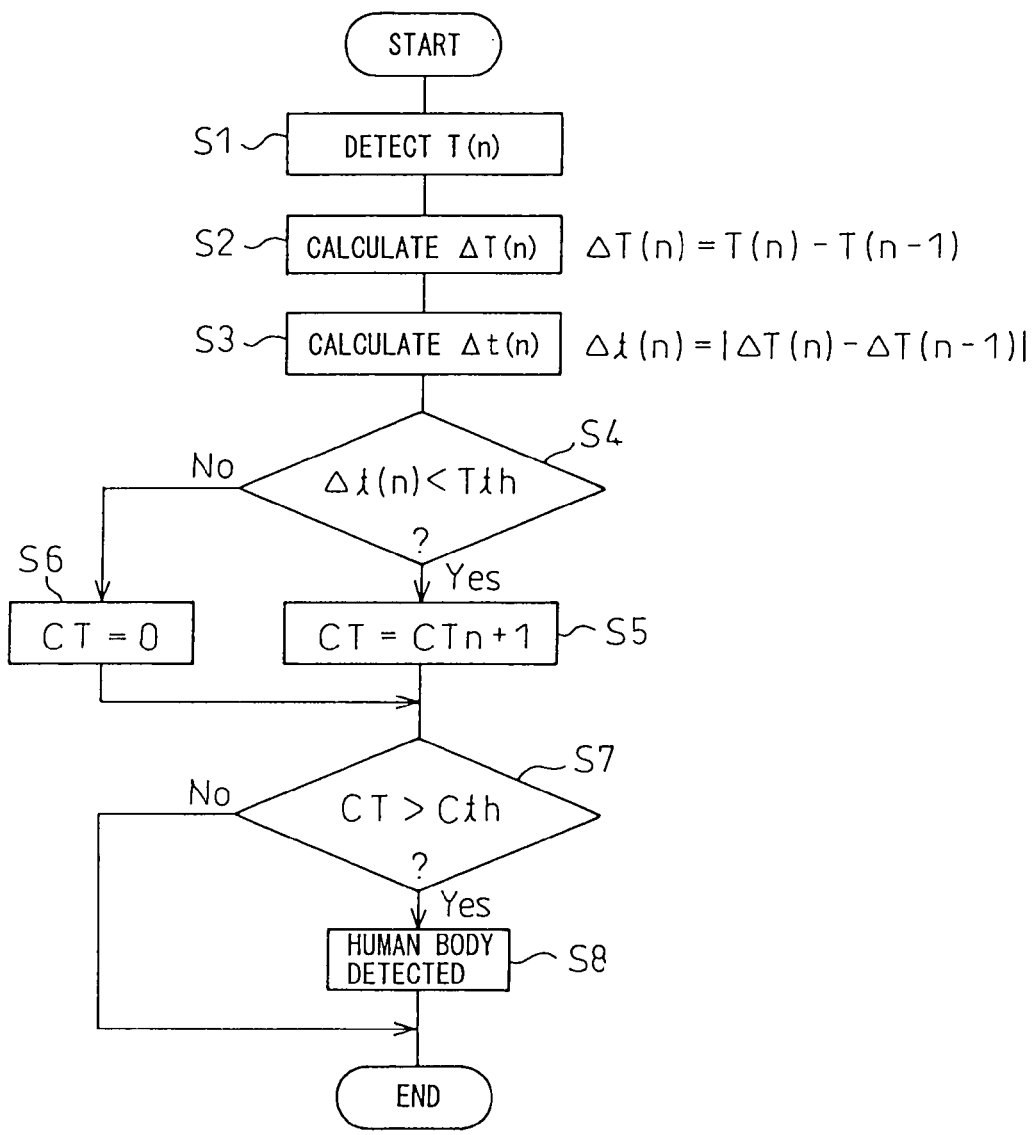
FIG. 4 is a diagram showing in flowchart form a human body detection method according to the present invention.

FIG. 4 is a diagram showing in flowchart form another human body detection method according to the present invention. In the flowchart shown in FIG. 3, when it is detected that Δt(n)<Tth, it is determined that the waveform represents a human breathing motion, and the presence of a human body is thus detected. On the other hand, in the flowchart shown in FIG. 4, when the condition Δt(n)<Tth has been detected more than a predetermined number of times, it is determined that the waveform represents a human breathing motion, thus detecting the presence of a human body.

In FIG. 4, S1 to S4 are the same as the corresponding steps in the flow of FIG. 3. If the condition Δt(n)<Tth is satisfied in S4 (Yes), counter value CT is incremented by 1, i.e., CT=CTn+1 (S5). On the other hand, if the condition Δt(n)<Tth is not satisfied in S4 (No), the counter value CT is reset, i.e., CT=0 (S6). Next, it is determined whether CT is larger than the predetermined number Cth (S7) and, if the condition CT>Cth is satisfied (Yes), it is determined that the waveform represents a human breathing motion, and the presence of a human body is thus detected (S8); if the answer is No, the process is terminated thereupon.

Figure 5:
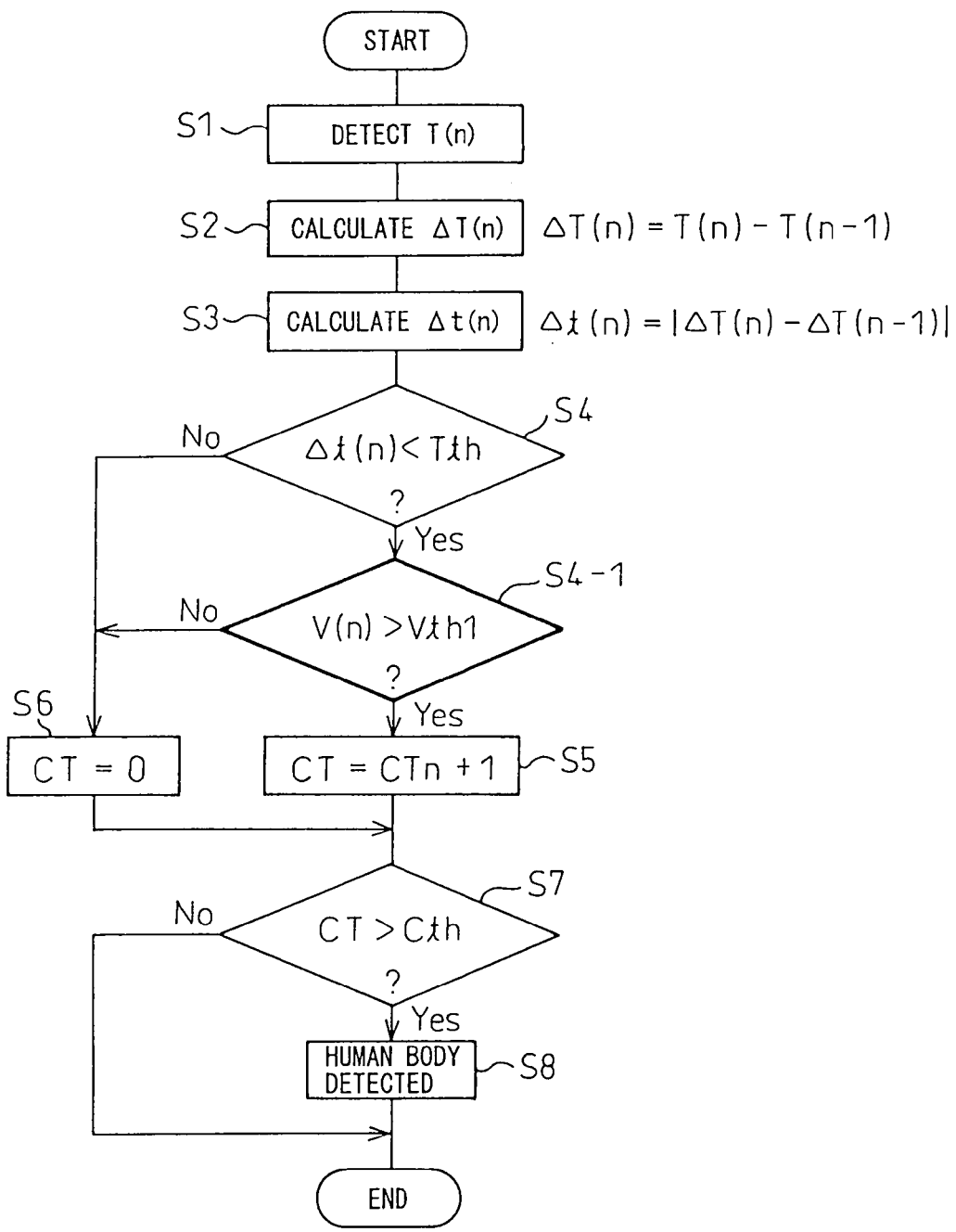
FIG. 5 is a modification of the flowchart shown in FIG. 4.

FIG. 5 is a modification of the flowchart shown in FIG. 4. The difference from FIG. 4 is that S4-1 is inserted after S4. In FIG. 5, if it is determined that Δt(n)<Tth in S4 (Yes), then it is determined whether the peak level V(n) of the breathing motion signal waveform shown in FIG. 2 is larger than a predetermined level Vth1 (see FIG. 2) (S4-1). If the condition V(n)>Vth1 is satisfied (Yes), the counter value CT is incremented by 1, i.e., CT=CTn+1 (S5). On the other hand, if the condition V(n)>Vth1 is not satisfied in S4-1 (No), the counter value CT is reset, i.e., CT=0 (S6). The reason that the counter is reset here is that if the peak level V(n) of the breathing motion signal waveform is smaller than the predetermined level Vth1 (No in S4-1), there is the possibility that the detected waveform may not be that of a breathing motion but may merely be that of noise.

Next, it is determined whether CT is larger than the predetermined number Cth (S7) and, if the condition CT>Cth is satisfied (Yes), it is determined that the waveform represents a human breathing motion, thus detecting the presence of a human body (S8).

In this way, by incrementing the counter value only when the signal level is larger than the predetermined value (Vth1), noise due to external disturbance can be eliminated from the target of detection.

Figure 6:
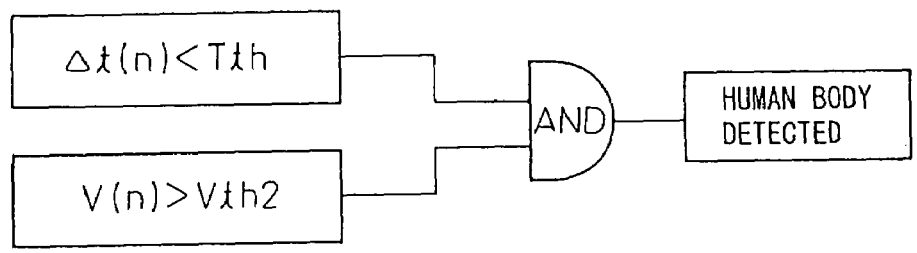
FIG. 6 is a diagram for explaining a human body detection method according to the present invention, in which the presence of a human body is detected when two conditions are satisfied.

FIG. 6 is a diagram illustrating a human body detection method according to the present invention by using an AND circuit. In the flowchart of FIG. 3, if it is determined in S4 that Δt(n)<Tth (Yes), and if the peak level V(n) of the breathing motion signal waveform is larger than a predetermined level Vth2 that is larger than Vth1 (V(n)>Vth2), then it is determined that the presence of a human body has been detected. That is, when the condition Δt(n)<Tth and the condition V(n)>Vth2 are both satisfied, the AND circuit produces an output, thus detecting the presence of a human body. Here, the condition is set that the signal level is larger than the predetermined level Vth2 that is larger than the level Vth1, in order to ensure that the detection is made only when the breathing motion signal occurs.

As described above, Vth2 is set larger than Vth1. The values of Vth1 and Vth2 shown in FIG. 2 are only examples, and can be changed as needed.

Figure 7:
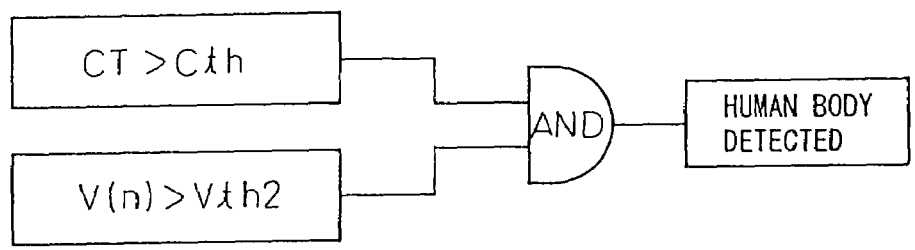
FIG. 7 is a diagram for explaining a human body detection method according to the present invention, in which the presence of a human body is detected when two conditions are satisfied.

FIG. 7 shows a method in which, in the flowchart of FIG. 4, if it is determined in S7 that CT>Cth (Yes), and if the peak level V(n) of the breathing motion signal waveform is larger than the predetermined level Vth2 (V(n)>Vth2), then it is determined that the presence of a human body has been detected. That is, when the condition CT>Cth and the condition V(n)>Vth2 are both satisfied, the AND circuit produces an output, thus detecting the presence of a human body.

Figure 8:
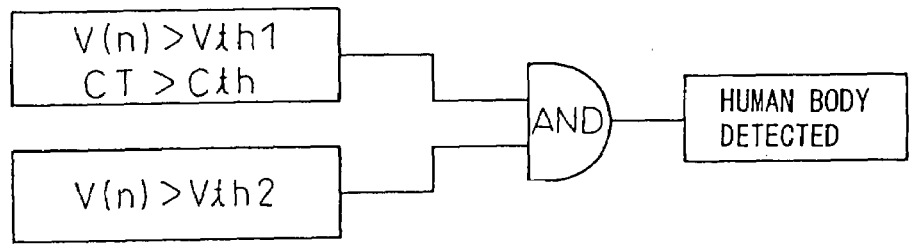
FIG. 8 is a diagram for explaining a human body detection method according to the present invention, in which the presence of a human body is detected when two conditions are satisfied.

FIG. 8 shows a method in which, in the flowchart of FIG. 5, if the signal peak level is larger than Vth1 in S4-1, therefore not causing the counter value to be reset, and if it is determined in S7 that CT>Cth (Yes), then if the peak level V(n) of the breathing motion signal waveform is larger than the predetermined level Vth2 (V(n)>Vth2), it is determined that the presence of a human body has been detected. That is, when the signal peak level V(n) is larger than the predetermined level Vth1, therefore not causing the counter value to be reset, and when the condition CT>Cth and the condition V(n)>Vth2 are both satisfied, the AND circuit produces an output, thus detecting the presence of a human body.

The difference from FIG. 7 is that since CT>Cth, the condition V(n)>Vth1 is satisfied.

Figure 9:
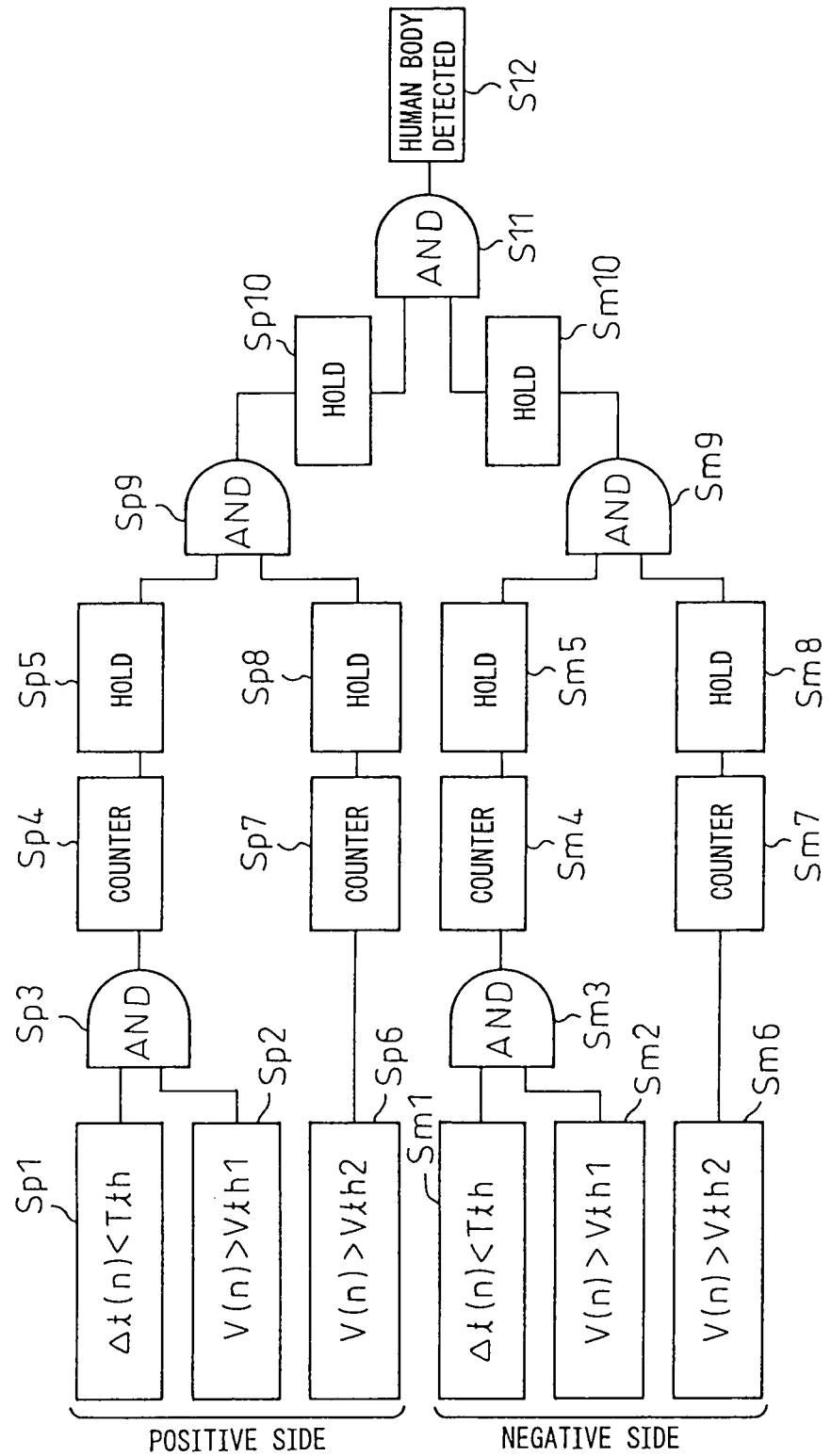
FIG. 9 is a diagram for explaining a human body detection method according to the present invention, in which the presence of a human body is detected when a plurality of conditions are satisfied.

FIG. 9 is a diagram illustrating a method for detecting the presence of a human body by combining the following conditions described with reference to the flowcharts of FIGS. 3 to 5.

<Conditions>
(1) Δt(n)<Tth
(2) V(n)>Vth1
(3) V(n)>Vth2

Since a human breathing motion is a cyclic repetition of inhaling and exhaling, one followed by the other, the signal waveform of the breathing motion swings positive and negative alternately as shown in FIG. 2. The upper half of FIG. 9 shows a method for detecting the presence of a human body based on the peaks on the positive side of the breathing motion signal waveform shown in FIG. 2, while the lower half shows a method for detecting the presence of a human body based on the peaks on the negative side of the signal waveform. The human body detection method will be described below with reference to FIG. 9.

First, from the detected times of the peaks on the positive side of the waveform, it is determined whether Δt(n)<Tth (Sp1), and then, from the peak level on the positive side of the waveform, it is determined whether V(n)>Vth1 (Sp2). When these two conditions are satisfied, an AND circuit (Sp3) produces an output, which is counted by a counter, and when the counter counts up to a predetermined number (Sp4), the value is held (Sp5). In this embodiment, the reason that the value is held here is that if the value is not held, two outputs (Sp4 and Sp7) to an AND circuit (Sp9) may be shifted in timing and displaced from each other and the AND circuit may not produce an output. When the value is held (Sp5), one of the conditions for the AND circuit (Sp9) holds. On the other hand, from the peak level on the positive side of the waveform, it is determined whether V(n)>Vth2 (Sp6); if the answer is Yes, the event is counted by a counter, and when the counter counts up to a predetermined number (Sp7), the value is held. When the value is held (Sp8), the other one of the conditions for the AND circuit (Sp9) holds. When the two conditions for the AND circuit hold, its output is held (Sp10), and one of the conditions for an AND circuit (S11) thus holds.

Next, from the detected times of the peaks on the negative side of the waveform, it is determined whether Δt(n)<Tth (Sm1), and then, from the peak level on the negative side of the waveform, it is determined whether V(n)>Vth1 (Sm2). When these two conditions are satisfied, an AND circuit (Sm3) produces an output, which is counted by a counter, and when the counter counts up to a predetermined number (Sm4), the value is held. When the value is held (Sm5), one of the conditions for an AND circuit (Sm9) holds. On the other hand, from the amplitude of the waveform on the negative side, it is determined whether V(n)>Vth2 (Sm6); if the answer is Yes, the event is counted by a counter, and when the counter counts up to a predetermined number (Sm7), the value is held. When the value is held (Sm8), the other one of the conditions for the AND circuit (Sm9) holds. When the two conditions for the AND circuit hold, its output is held, and the other one of the conditions for the AND circuit (S11) thus holds. When the two conditions for the AND circuit hold, it is determined that the presence of a human body has been detected.

In the above example, the presence of a human body is detected only when the two conditions hold for the AND circuit (S11), but alternatively, the presence of a human body may be detected when either one of the AND circuits (Sp9 or Sm9) has produced an output. In the above example, Δt(n) and V(n) are both absolute values.

Figure 10:
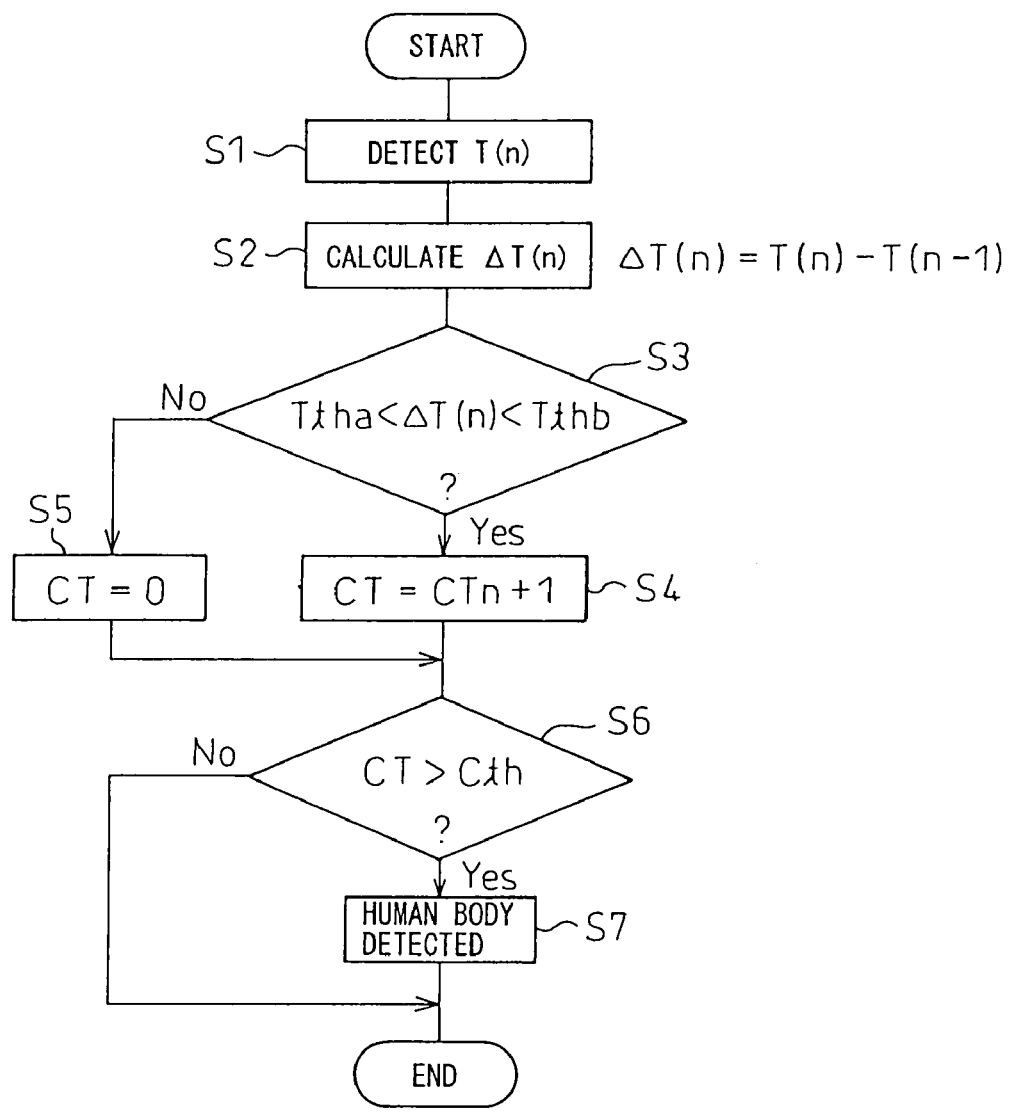
FIG. 10 is a diagram showing in flowchart form a human body detection method according to the present invention.

FIG. 10 is a diagram showing in flowchart form a human body detection method according to the present invention; in this method, when the peak-to-peak time interval has been within a predetermined time interval range over a predetermined number of times, then it is determined that the signal represents a human breathing motion, and the presence of a human body is thus detected.

In FIG. 10, first the times T(n) at which peaks occur in the breathing motion signal are detected (S1). Next, the peak-to-peak time interval ΔT(n)=T(n)−T(n−1) is calculated (S2). Then, it is determined whether the peak-to-peak time interval ΔT(n) is within the predetermined time interval range (S3). For example, when the lower limit of the predetermined time interval range is denoted by Ttha and the upper limit by Tthb, then if the condition $$Ttha < \Delta T(n) < Tthb$$

is satisfied (Yes), the counter value CT is incremented by 1, i.e., CT=CTn+1 (S4). On the other hand, if the condition $$Ttha < \Delta T(n) < Tthb$$

is not satisfied in S3 (No), the counter value CT is reset, i.e., CT=0 (S5). Next, it is determined whether CT is larger than the predetermined number Cth (S6) and, if the condition $$CT > Cth$$

is satisfied (Yes), it is determined that the waveform represents a human breathing motion, and the presence of a human body is thus detected (S7).

EMBODIMENT 2

While, in the first embodiment, the human body detection has been performed by detecting the times at which peaks occur in the breathing motion signal waveform, in a second embodiment the presence of a human body is detected by detecting the times at which the breathing motion signal waveform rises (or falls).

Figure 11:
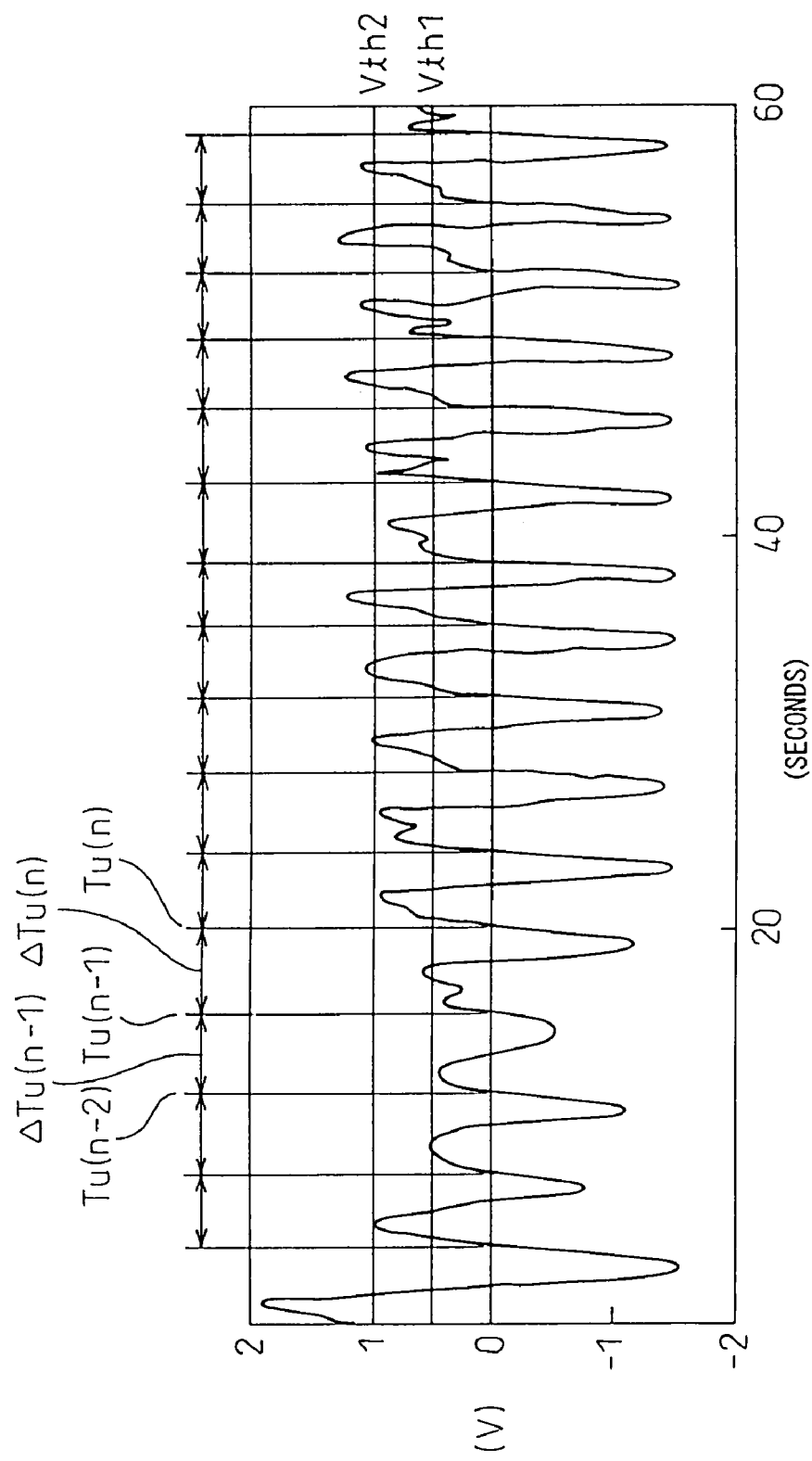
FIG. 11 is a diagram showing the signal waveform of a human breathing motion obtained by the human body detection apparatus.

FIG. 11 is a diagram similar to FIG. 2, showing the signal waveform of a human breathing motion. The abscissa represents the time (seconds), and the ordinate represents the breathing motion detected and expressed in volts (V). The difference from FIG. 2 is that the times Tu(n) at which the signal waveform rises are detected.

Figure 12:
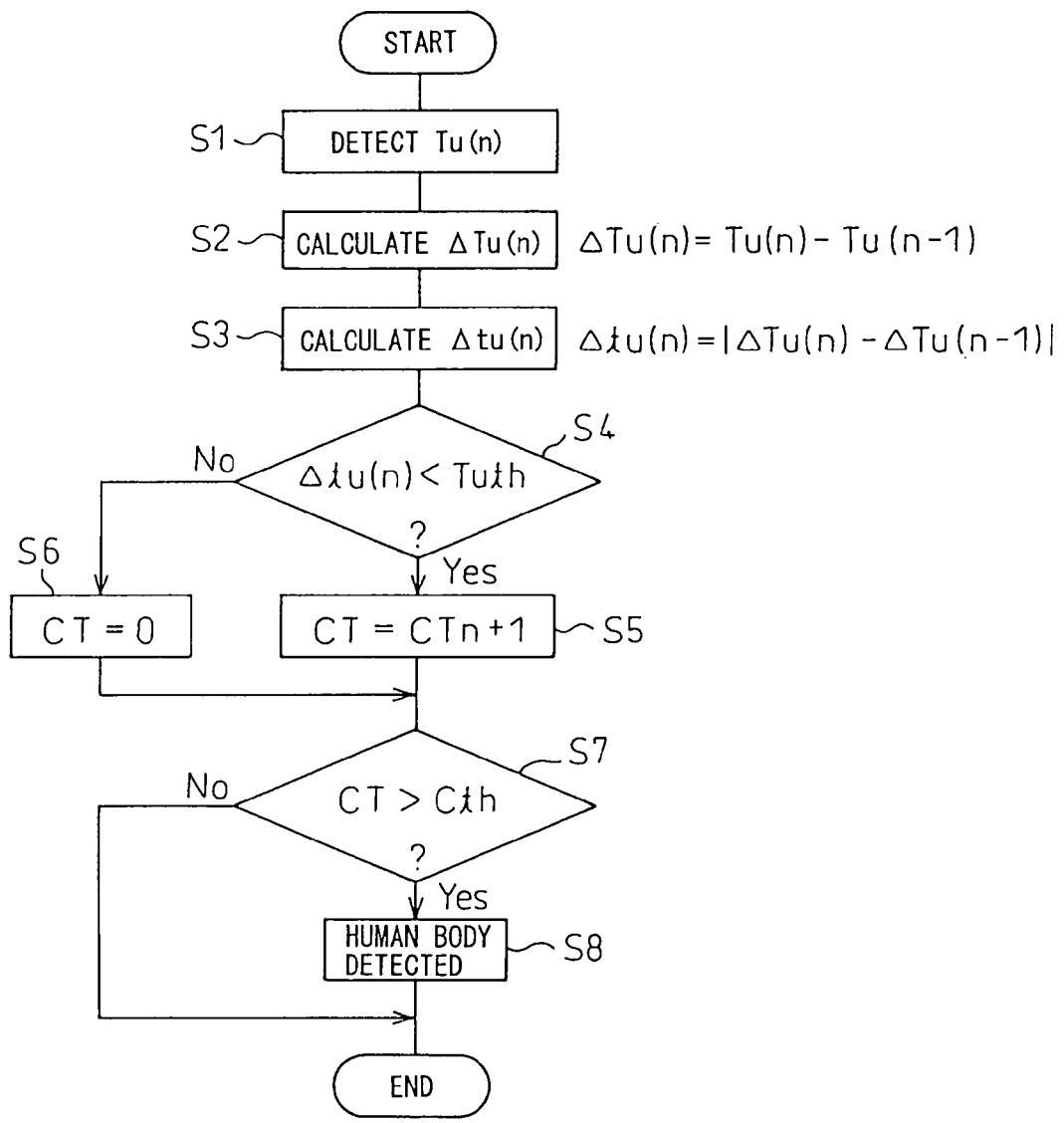
FIG. 12 is a diagram showing in flowchart form a human body detection method according to the present invention.

FIG. 12 is a diagram showing in flowchart form the human detection method according to the second embodiment. In FIG. 12, the times Tu(n) at which the signal waveform rises are detected (S1). Next, the rise-to-rise time interval ΔTu(n)=Tu(n)−Tu(n−1) is calculated (S2). Then, the difference Δtu(n) between rise-to-rise time intervals is calculated (S3). The difference Δtu(n) between the rise-to-rise time intervals is the difference between the time intervals ΔTu(n), which is calculated as $$\Delta tu(n) = |\Delta Tu(n) - \Delta Tu(n-1)| \text{ (absolute value)}$$

where $$\Delta Tu(n) = Tu(n) - Tu(n-1) \text{ and}$$

$$\Delta Tu(n-1) = Tu(n-1) - Tu(n-2)$$

Next, it is determined whether Δtu(n) is smaller than a predetermined threshold value Tuth (S4). If the condition $$\Delta tu(n) < Tuth$$

is satisfied (Yes), the counter value CT is incremented by 1, i.e., CT=CTn+1 (S5). On the other hand, if the condition $$\Delta tu(n) < Tuth$$

is not satisfied in S4 (No), the counter value CT is reset, i.e., CT=0 (S6). Next, it is determined whether CT is larger than the predetermined number Cth (S7) and, if the condition $$CT > Cth$$

is satisfied (Yes), it is determined that the waveform represents a human breathing motion, and the presence of a human body is thus detected (S8).

In the above flowchart, the times Tu(n), at which the signal rises, have been detected but, alternatively, the times Td(n) at which the signal falls may be detected. In the above description, the waveform on the positive side of the signal has been used, but instead, the waveform on the negative side may be used.

EMBODIMENT 3

The human body detection has been performed in the first embodiment by detecting the times at which peaks occur in the breathing motion signal waveform, and in the second embodiment by detecting the times at which the breathing motion signal waveform rises (or falls); in contrast, in a third embodiment, the presence of a human body is detected by detecting the time width of the breathing motion signal waveform (the time interval between the rising and falling of the waveform).

Figure 13:
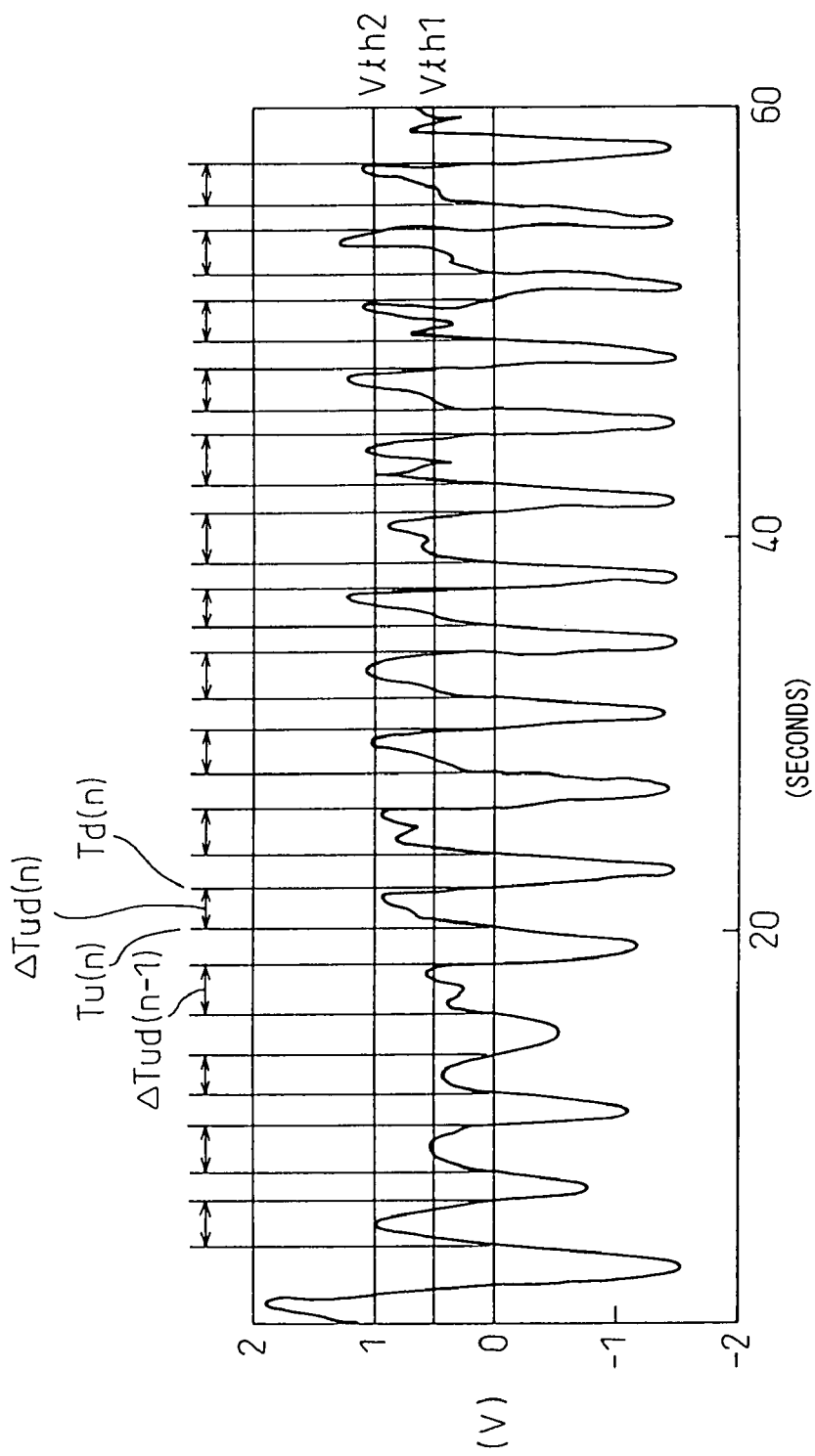
FIG. 13 is a diagram showing the signal waveform of a human breathing motion obtained by the human body detection apparatus.

FIG. 13 is a diagram similar to FIG. 2, showing the signal waveform of a human breathing motion. The abscissa represents the time (seconds), and the ordinate represents the breathing motion detected and expressed in volts (V). The difference from FIG. 2 is that the time width $\Delta Tud(n)$ of the signal waveform is detected.

Figure 14:
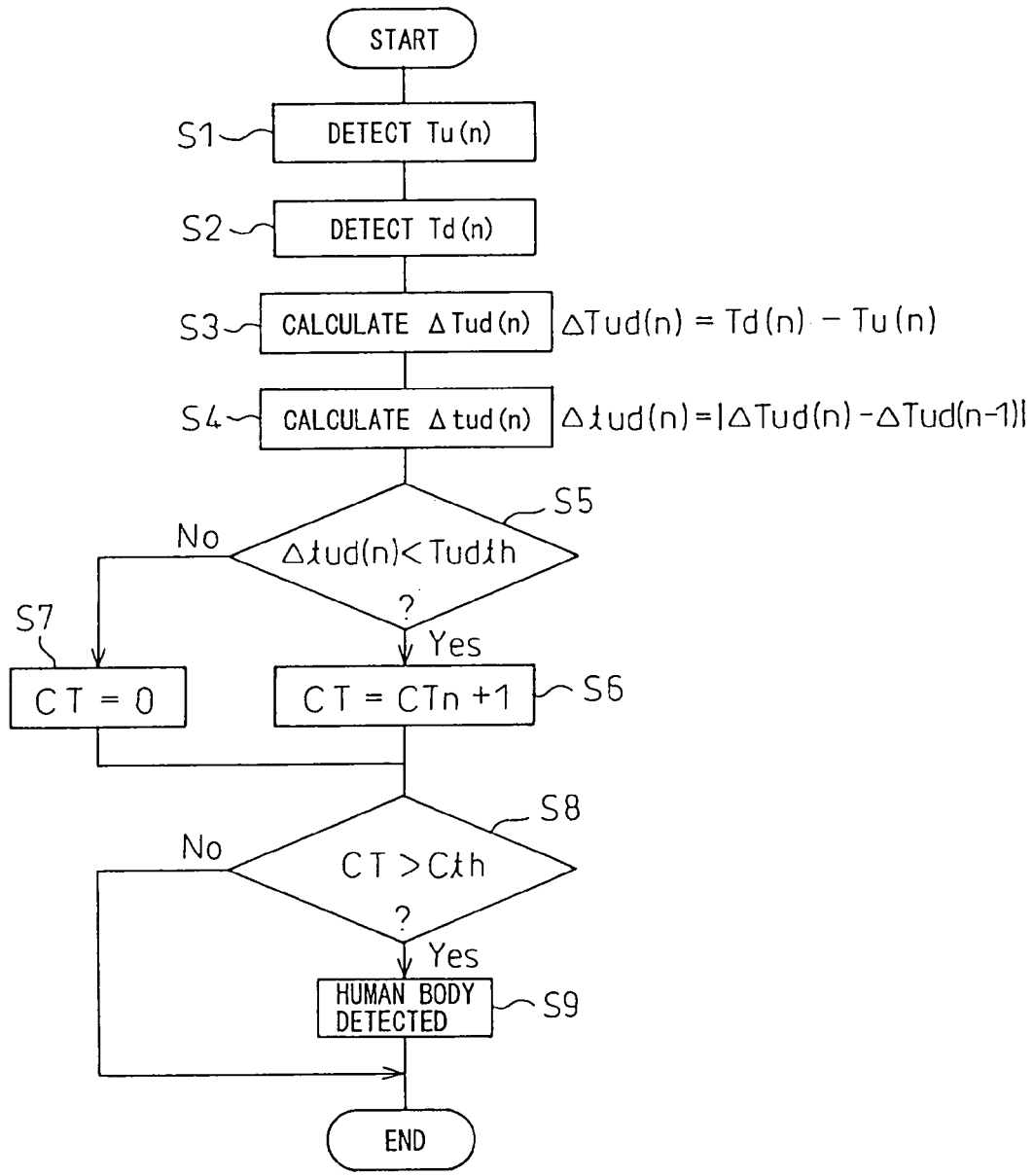
FIG. 14 is a diagram showing in flowchart form a human body detection method according to the present invention.

FIG. 14 is a diagram showing in flowchart form the human detection method according to the third embodiment. In FIG. 14, the time Tu(n) at which the signal waveform rises is detected (S1). Next, the time Td(n) at which the signal waveform falls is detected (S2). Then, the time interval (hereinafter referred to as the "signal waveform width") $\Delta Tud(n)$ between the time Tu(n) at which the signal waveform rises and the time Td(n) at which the signal waveform falls is calculated as follows (S3).

$$\Delta Tud(n)=Td(n)-Tu(n)$$

After obtaining each signal waveform width as described above, the difference $\Delta tud(n)$ between signal waveform widths is obtained as follows (S4).

$$\Delta tud(n)=|\Delta Tud(n)-\Delta Tud(n-1)|$$

Then, it is determined whether $\Delta tud(n)$ is smaller than a predetermined value Tudth (S6). If the condition $$\Delta tud(n)<Tudth$$

is satisfied (Yes), the counter value CT is incremented by 1, i.e., CT=CTn+1 (S6). On the other hand, if the condition $$\Delta tud(n)<Tudth$$

is not satisfied in S5 (No), the counter value CT is reset, i.e., CT=0 (S7). Next, it is determined whether CT is larger than the predetermined number Cth (SB) and, if the condition $$CT>Cth$$

is satisfied (Yes), it is determined that the waveform represents a human breathing motion, and the presence of a human body is thus detected (S9).

EMBODIMENT 4

While, in the first embodiment, the human body detection has been performed by detecting the times at which peaks occur in the breathing motion signal waveform, in a fourth embodiment the times at which positive and negative peaks occur in the breathing motion signal waveform are detected, and the time interval from the positive peak to the negative peak and the time interval from the negative peak to the positive peak are calculated; then, the ratio of the time interval from the positive peak to the negative peak to the time interval from the positive peak to the next positive peak is calculated, and the presence of a human body is detected based on this ratio.

Figure 15:
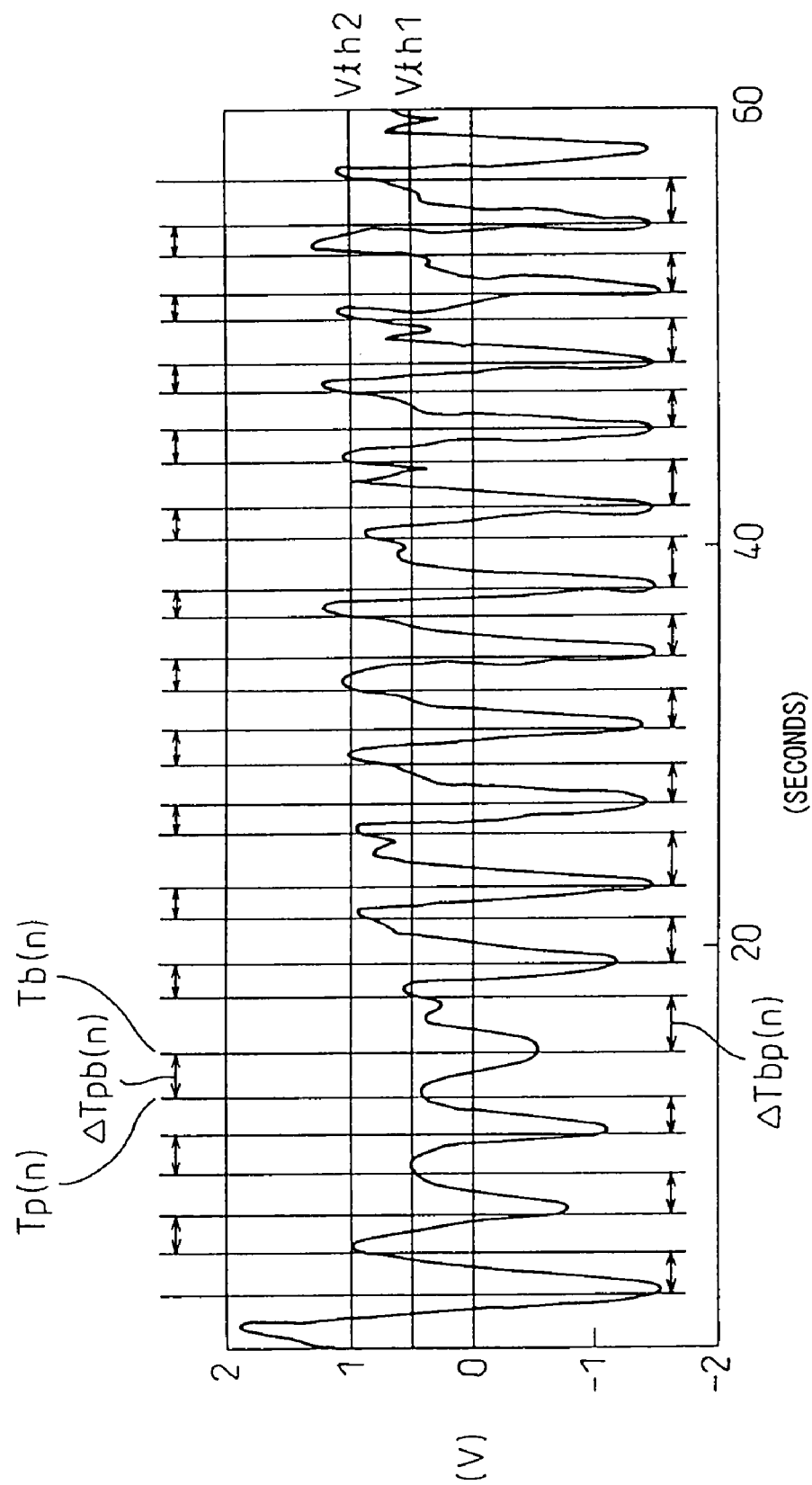
FIG. 15 is a diagram showing the signal waveform of a human breathing motion obtained by the human body detection apparatus.

FIG. 15 is a diagram similar to FIG. 2, showing the signal waveform of a human breathing motion. The abscissa represents the time (seconds), and the ordinate represents the breathing motion detected and expressed in volts (V). The difference from FIG. 2 is that the times at which positive and negative peaks occur in the signal waveform are detected.

Figure 16:
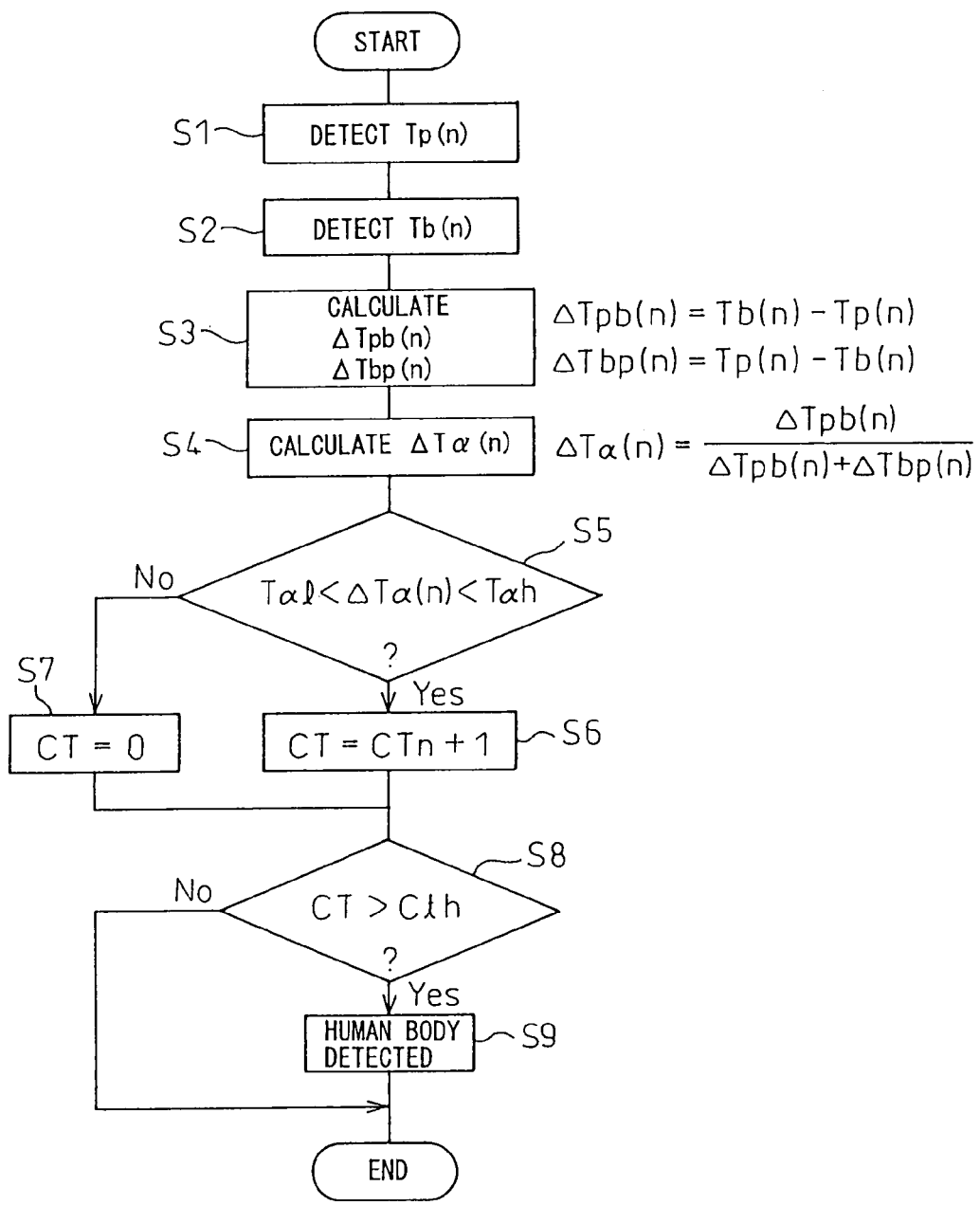
FIG. 16 is a diagram showing in flowchart form a human body detection method according to the present invention.

FIG. 16 is a diagram showing in flowchart form the human detection method according to the fourth embodiment. In FIG. 16, peak time Tp(n) on the positive side of the signal waveform is detected (S1), and peak (bottom) time Tb(n) on the negative side is detected (S2). Next, the time interval $\Delta Tpb(n)$ from the positive peak to the negative peak and the time interval $\Delta Tbp(n)$ from the negative peak to the positive peak are calculated as follows (S2).

$$\Delta Tpb(n)=Tb(n)-Tp(n)$$

$$\Delta Tbp(n)=Tp(n)-Tb(n)$$

Next, the ratio of the time interval from the positive peak to the negative peak to the time interval from the positive peak to the next positive peak is calculated as follows (S4).

$$\Delta T\alpha(n)=\Delta Tpb(n)/(\Delta Tpb(n)+\Delta Tbp(n))$$

Then, it is determined whether $\Delta T\alpha(n)$ is within a prescribed range, in accordance with the following condition (S5).

$T\alpha l<\Delta T\alpha(n)<T\alpha h$ ($T\alpha l$ is the lower limit value of the ratio, and $T\alpha h$ is the upper limit value of the ratio)

If Yes is determined in S5, the counter value CT is incremented by 1, i.e., CT=CTn+1 (S6). On the other hand, if No is determined in S5, the counter value CT is reset, i.e., CT=0 (S7). Next, it is determined whether CT is larger than the predetermined number Cth (S8) and, if the condition $$CT>Cth$$

is satisfied (Yes), it is determined that the waveform represents a human breathing motion, and the presence of a human body is thus detected (S9).

In the above example, the ratio of the time interval from the positive peak to the negative peak to the time interval between the positive peaks has been obtained, but instead, the ratio of the time interval from the negative peak to the positive peak to the time interval between the positive peaks may be obtained. Alternatively, the ratio of the time interval from the positive peak to the negative peak or the time interval from the negative peak to the positive peak to the time interval between the negative peaks may be obtained.

Figure 17:
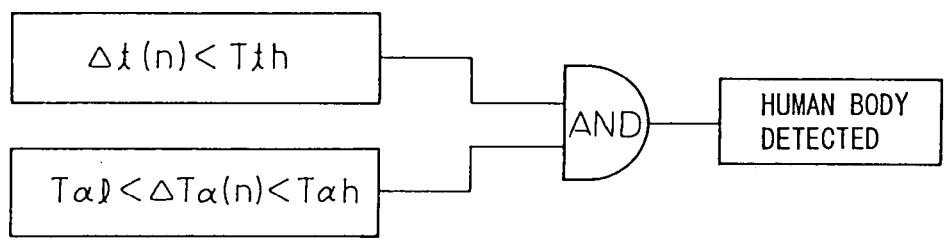
FIG. 17 is a diagram for explaining a human body detection method according to the present invention, in which the presence of a human body is detected when two conditions are satisfied.

FIG. 17 shows a method in which, if it is determined that $\Delta t(n)<Tth$ (Yes) in S4 in the flowchart of FIG. 3, and if the ratio $\Delta T\alpha(n)$ in FIG. 16 satisfies the condition $T\alpha l<\Delta T\alpha(n)<T\alpha h$, then it is determined that the presence of a human body has been detected. That is, when the condition $\Delta t(n)<Tth$ and the condition $T\alpha l<\Delta T\alpha(n)<T\alpha h$ are both satisfied, the AND circuit produces an output, thus detecting the presence of a human body.

Figure 18:
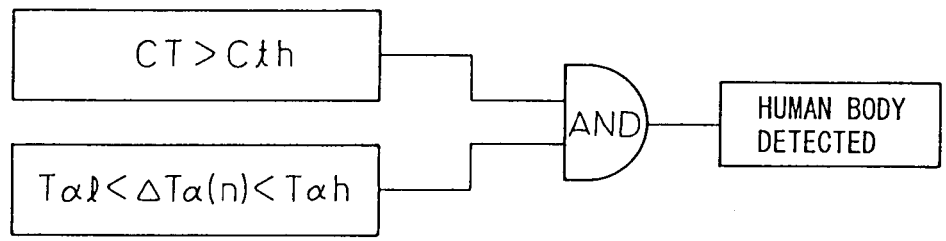
FIG. 18 is a diagram for explaining a human body detection method according to the present invention, in which the presence of a human body is detected when two conditions are satisfied.

FIG. 18 shows a method in which if it is determined that $CT<Cth$ (Yes) in S7 in the flowchart of FIG. 4, and if the ratio $\Delta T\alpha(n)$ in FIG. 16 satisfies the condition $T\alpha l<\Delta T\alpha(n)<T\alpha h$, then it is determined that the presence of a human body has been detected. That is, when the condition $\Delta t(n)$ <Tth and the condition Tαl<ΔTα(n)<Tαh are both satisfied, the AND circuit produces an output, thus detecting the presence of a human body.

The invention claimed is:

1. A human body detection method for detecting a human body in a vehicle, comprising:
    detecting chest motion associated with breathing and obtaining a breathing motion signal representing said chest motion in the form of an electrical signal;
    detecting times at which specific points occur in a waveform of said breathing motion signal; and
    detecting the presence of a human body in said vehicle when time interval between said specific points is within a predetermined range,
    wherein said specific points in the waveform of said breathing motion signal are peaks on a positive or negative side of the waveform of said breathing motion signal, and
    wherein the times (T(n)) at which said peaks occur are detected to obtain a peak-to-peak time interval (ΔT(n)),
    a difference (Δt(n)) between peak-to-peak time intervals is obtained from said peak-to-peak time interval (ΔT(n)), and
    the presence of a human body is detected in said vehicle when the difference (Δt(n)) between said peak-to-peak time intervals is smaller than a predetermined value (Tth).

2. A human body detection method as claimed in claim 1, wherein the number of times that the difference (Δt(n)) between said peak-to-peak time intervals is smaller than said predetermined value (Tth) is counted by a counter and, when the number of times counted is larger than a predetermined number (Cth), the presence of a human body is detected in said vehicle.

3. A human body detection method as claimed in claim 2, wherein said counter is reset when said peaks are not larger in magnitude than a predetermined level (Vth1).

4. A human body detection method as claimed in claim 3 wherein, when said counter is not reset, and the number of times counted is larger than said predetermined number (Cth), and when said peaks are larger in magnitude than a predetermined level (Vth2), the presence of a human body is detected in said vehicle.

5. A human body detection method as claimed in claim 2 wherein, when the number of times counted is larger than said predetermined number (Cth), and when said peaks are larger in magnitude than a predetermined level (Vth2), the presence of a human body is detected in said vehicle.

6. A human body detection method as claimed in claim 1 wherein, when the difference (Δt(n)) between said peak-to-peak time intervals is smaller than said predetermined value (Tth), and when said peaks are larger in magnitude than a predetermined level (Vth2), the presence of a human body is detected in said vehicle.

7. A human body detection method as claimed in claim 1 wherein, when two conditions, one being that the difference (Δt(n)) between said peak-to-peak time intervals is smaller than said predetermined value (Tth) and the other being that said peaks are larger in magnitude than a predetermined level (Vth1), are satisfied (CONDITION 1), and when the condition that said peaks are larger in magnitude than a predetermined level (Vth2) is satisfied (CONDITION 2), the presence of a human body is detected in said vehicle.

8. A human body detection method as claimed in claim 7 wherein, when said CONDITION 1 and said CONDITION 2 are respectively satisfied a predetermined number of times, outputs thereof are held, and an AND circuit produces an output to detect the presence of a human body in said vehicle.

9. A human body detection method as claimed in claim 1 wherein, when two conditions, one being that the difference (Δt(n)) between said peak-to-peak time intervals is smaller than said predetermined value (Tth) and the other being that said peaks are larger in magnitude than a predetermined level (Vth1), are satisfied on both the positive and negative sides of said waveform (CONDITION 1), and when the condition that said peaks are larger in magnitude than a predetermined level (Vth2) is satisfied (CONDITION 2), the presence of a human body is detected in said vehicle.

10. A human body detection method as claimed in claim 9 wherein, when said CONDITION 1 and said CONDITION 2 are respectively satisfied a predetermined number of times, outputs thereof are held, and AND circuits produces outputs, which are held and are input to an AND circuit that follows said AND circuits, and when conditions for said AND circuit are satisfied on both said positive and negative sides, the presence of a human body is detected in said vehicle.

11. A human body detection method as claimed in claim 1 wherein, when said peak-to-peak time interval (ΔT(n)) is within a predetermined time interval range, the presence of a human body is detected in said vehicle.

12. A human body detection method for detecting a human body in a vehicle, comprising:
    detecting chest motion associated with breathing and obtaining a breathing motion signal representing said chest motion in the form of an electrical signal;
    detecting times at which specific points occur in a waveform of said breathing motion signal; and
    detecting the presence of a human body in said vehicle when time interval between said specific points is within a predetermined range,
    wherein said specific points in the waveform of said breathing motion signal are rising or falling points of the waveform of said breathing motion signal, and
    wherein the times (Tu(n)) at which said rising or falling points occur are detected to obtain a time interval (ΔTu(n)) between said rising or falling points,
    a difference (Δtu(n)) between time intervals is obtained from said time interval (ΔTu(n)),
    the number of times that the difference (Δtu(n)) between said time intervals is smaller than a predetermined value (Tuth) is counted by a counter, and
    when the number of times counted is larger than a predetermined number (Cth), the presence of a human body is detected in said vehicle.

13. A human body detection method for detecting a human body in a vehicle, comprising:
    detecting chest motion associated with breathing and obtaining a breathing motion signal representing said chest motion in the form of an electrical signal;
    detecting times at which specific points occur in a waveform of said breathing motion signal; and
    detecting the presence of a human body in said vehicle when time interval between said specific points is within a predetermined range,
    wherein said specific points in the waveform of said breathing motion signal are points defining a waveform width of said breathing motion signal, and
    wherein time interval (ΔTud(n)) of said waveform width is detected, a difference (Δtud(n)) between waveform width time intervals is obtained from said waveform width time interval (ΔTud(n)), the number of times that the difference (Δtud(n)) between said waveform width time intervals is smaller than a predetermined value (Tudth) is counted by a counter, and when the number of times counted is larger than a predetermined number (Cth), the presence of a human body is detected in said vehicle.

14. A human body detection method for detecting a human body in a vehicle, comprising:
   detecting chest motion associated with breathing and obtaining a breathing motion signal representing said chest motion in the form of an electrical signal;
   detecting times at which specific points occur in a waveform of said breathing motion signal; and
   detecting the presence of a human body in said vehicle when time interval between said specific points is within a predetermined range,
   wherein said specific points in the waveform of said breathing motion signal are positive and negative peaks of the waveform of said breathing motion signal, and
   wherein the times at which said positive and negative peaks occur are detected,
   the ratio of the time interval from said positive peak to said negative peak or from said negative peak to said positive peak to the time interval from said positive peak to the next positive peak is obtained,
   the number of times that said ratio is within a predetermined range is counted by a counter, and
   when the number of times counted is larger than a predetermined number (Cth), the presence of a human body is detected in said vehicle.

15. A human body detection method as claimed in claim 14, wherein the ratio of the time interval from said positive peak to said negative peak or from said negative peak to said positive peak to the time interval from said negative peak to the next negative peak is obtained, the number of times that said ratio is within said predetermined range is counted by said counter, and when the number of times counted is larger than said predetermined number (Cth), the presence of a human body is detected in said vehicle.

16. A human body detection method as claimed in claim 14 wherein, when the number of times that said ratio is within said predetermined range, counted by said counter, is larger than said predetermined number (Cth), and when the difference (Δt(n)) between said peak-to-peak time intervals in the waveform of said breathing motion signal is smaller than a predetermined value (Tth), the presence of a human body is detected in said vehicle.

17. A human body detection method as claimed in claim 14 wherein, when the number of times that said ratio is within said predetermined range, counted by said counter, is larger than said predetermined number (Cth), and when the number of times that the difference (Δt(n)) between said peak-to-peak time intervals in the waveform of said breathing motion signal is smaller than said predetermined value (Tth), counted by said counter, is larger than said predetermined number (Cth), the presence of a human body is detected in said vehicle.

18. A human body detection apparatus for detecting a human body in a vehicle, comprising:
   means for detecting chest motion associated with breathing and obtaining a breathing motion signal representing said chest motion in the form of an electrical signal;
   means for detecting times at which specific points occur in a waveform of said breathing motion signal; and
   means for detecting the presence of a human body in said vehicle on the basis of the detected times,
   wherein said specific points in the waveform of said breathing motion signal are peaks on a positive or negative side of the waveform of said breathing motion signal; and
   said means for detecting times detect the times (T(n)) at which peaks occur to obtain a peak-to-peak time interval (ΔT(n)), and
   said means for detecting the presence of a human body obtain a difference (Δt(n)) between peak-to-peak time intervals from said peak-to-peak time interval (ΔT(n)), and detect the presence of a human body in said vehicle when the difference (Δt(n)) between said peak-to-peak time intervals is smaller than a predetermined value (Tth).

19. A vehicle providing a human body detection apparatus comprising:
   means for detecting chest motion associated with breathing and obtaining a breathing motion signal representing said chest motion in the form of an electrical signal;
   means for detecting times at which specific points occur in a waveform of said breathing motion signal; and
   means for detecting the presence of a human body in said vehicle on the basis of the detected times,
   wherein said specific points in the waveform of said breathing motion signal are peaks on a positive or negative side of the waveform of said breathing motion signal; and
   said means for detecting times detect the times (T(n)) at which peaks occur to obtain a peak-to-peak time interval (ΔT(n)), and
   said means for detecting the presence of a human body obtain a difference (Δt(n)) between peak-to-peak time intervals from said peak-to-peak time interval (ΔT(n)), and detect the presence of a human body in said vehicle when the difference (Δt(n)) between said peak-to-peak time intervals is smaller than a predetermined value (Tth).

* * * * *

UNITED STATES PATENT AND TRADEMARK OFFICE
CERTIFICATE OF CORRECTION

PATENT NO. : 7,276,030 B2  
APPLICATION NO. : 10/490501  
DATED : October 2, 2007  
INVENTOR(S) : Hirofumi Takasuka Page 1 of 1

It is certified that error appears in the above-identified patent and that said Letters Patent is hereby corrected as shown below:

In the Claims

Column 12, line 17, Claim 10        Delete "produces",  
                                                        Insert --produce--

Signed and Sealed this

Twenty-fourth Day of June, 2008

JON W. DUDAS  
*Director of the United States Patent and Trademark Office*